M. M. MIDDAUGH.
PIPE CLAMP.
APPLICATION FILED SEPT. 9, 1915.
1,194,209.
Patented Aug. 8, 1916.
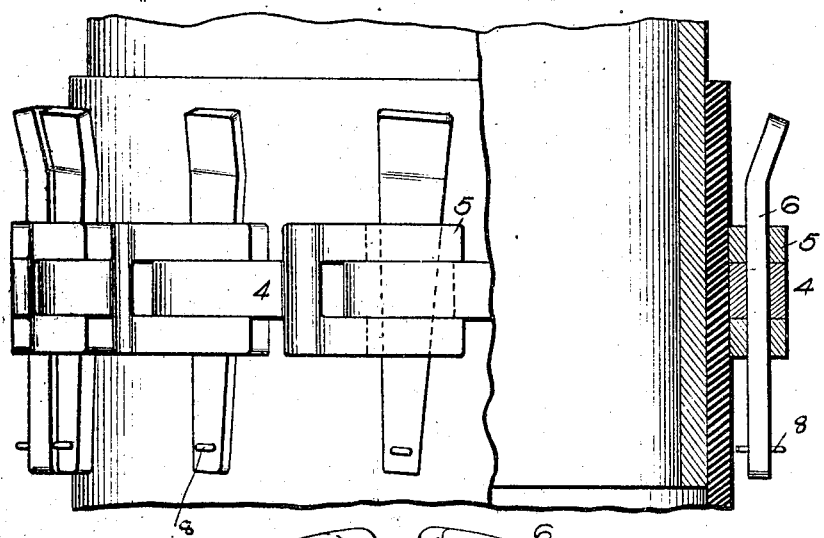
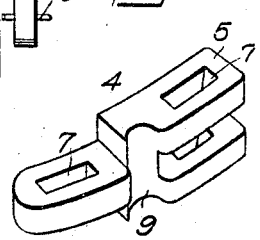
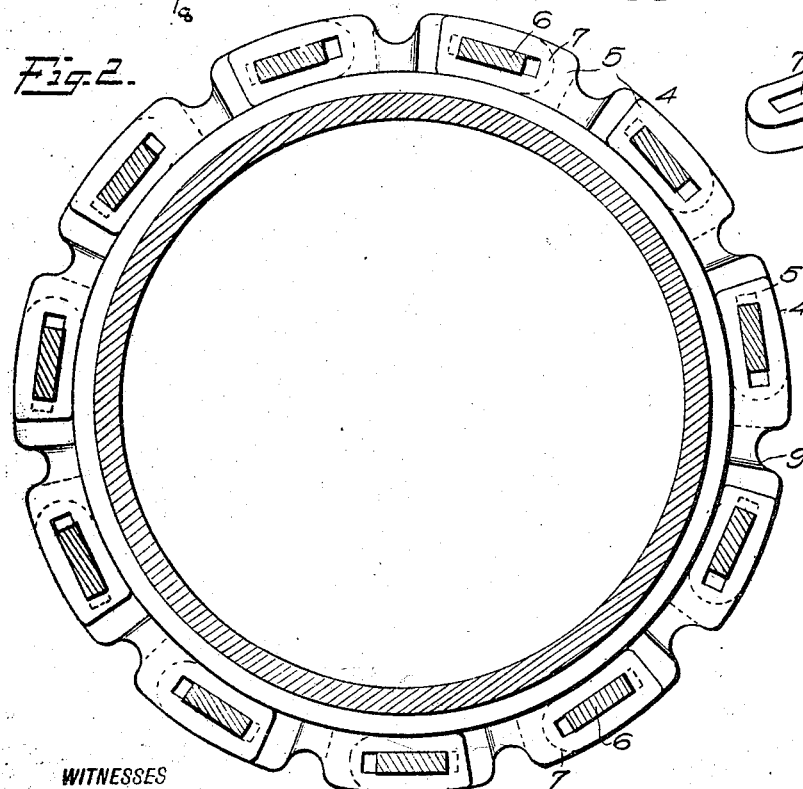
WITNESSES
INVENTOR
M. M. Middaugh
BY
ATTORNEYS

UNITED STATES PATENT OFFICE.

MELVIN MILLARD MIDDAUGH, OF TAMPA, FLORIDA.

PIPE-CLAMP.

1,194,209.

Specification of Letters Patent.

Patented Aug. 8, 1916.

Application filed September 9, 1915. Serial No. 49,713.

*To all whom it may concern:*

Be it known that I, MELVIN M. MIDDAUGH, a citizen of the United States, and a resident of Tampa, in the county of Hillsborough and State of Florida, have invented a new and Improved Pipe-Clamp, of which the following is a full, clear, and exact description.

My invention relates to pipe clamps, and an object thereof is to provide a simple, strong, and inexpensive clamp formed of a plurality of similar sections which render the clamp flexible.

A further object of the invention is to provide a clamp the size of which can be varied and the pressure of which on the object it clamps can be evenly adjusted, as the taking-up on the clamp can be made within predetermined points of the circumference of the clamp.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of the clamp partly in section, showing the same as applied for clamping a flexible sleeve to a tube; Fig. 2 is a plan view thereof; and Fig. 3 is a perspective view of a clamp link.

Before proceeding to a more detailed description of my invention, it must be clearly understood that although my clamp is mainly intended for bridge suction pipes, the same can be used as efficiently for any other clamping process where a more uniform pressure on the object to be clamped is desired.

Referring to the drawings, the clamp is formed of a plurality of links 4 each having a bifurcated end 5 into which the end of the adjacent link is adapted to fit easily. The links are maintained in engagement by wedge shaped keys 6 passing through elongated openings 7 formed at the ends of the links, longitudinally thereof. By forcing the keys into the openings, the size of the clamp can be varied within the limits of the opening 7; but by the addition or removal of links the diameter of the clamp may be changed to a great extent. The width of the keys at the upper edge is slightly greater than the length of the opening 7, so that the keys cannot drop out because of the larger end. All of the keys 6, with the exception of one, are provided with cotter pins 8 to prevent their loss. The key, without the cotter pin, permits the securing of the clamp about the pipe.

It will be noted that the links are slightly curved, which gives a larger surface of contact between the link and the object to be gripped. Each link has a cut-out 9 on the outer side, substantially midway between the ends and transversely of the link, which allows the links to give slightly when the clamp is gripping an object, whereby the links will adjust slightly to the curvature of the object they clamp.

From the above description it will be seen that my clamp is flexible, due to the plurality of the links forming it, and that the pressure of the clamp on the object can be uniformly applied to the object by forcing each of the keys 6 into the links, thereby applying pressure at each link. This is of great advantage when holding together sections of building-up columns while the columns are formed.

I claim:

In a clamp of the class described, a plurality of links each having a bifurcated end engaging the end of the adjacent link, said links having openings in the ends thereof adapted to register, and wedge-shaped keys engaging the registering openings whereby the links are connected, each of said links having a reduced portion on the outer side thereof between its ends disposed transversely of the link, whereby the link is adapted to give at the reduced portions, substantially as and for the purpose set forth.

In testimony whereof I have signed my name to this specification in the presence of two subscribing witnesses.

MELVIN MILLARD MIDDAUGH.

Witnesses:
J. A. O'BRIEN,
J. W. HERMAN, Jr.